United States Patent Office 3,062,780
Patented Nov. 6, 1962

3,062,780
HIGH MOLECULAR WEIGHT LINEAR POLYCARBONATES
Heinrich Rinke, Leverkusen-Saar, Wolfgang Lehmann, Leverkusen-Bayerwerk, and Hermann Schnell, Krefeld-Urdingen, Germany, assignors to Farbenfabriken Bayer Aktiengesellschaft, Leverkusen, Germany, a corporation of Germany
No Drawing. Filed Nov. 20, 1957, Ser. No. 697,532
Claims priority, application Germany Nov. 20, 1956
21 Claims. (Cl. 260—47)

This invention relates to high molecular linear polycarbonates containing recurring groups having the following general formula:

$$-O-A-O-y-O-A-O-\overset{O}{\underset{\|}{C}}-$$

wherein A represents an alkylene residue selected from the group consisting of ethylene and propylene and $y$ represents an aromatic nucleus which is connected to the oxygen atoms in the above general formula by para linkages directly attached to an aromatic nucleus and which is selected from the group consisting of the following radicals:

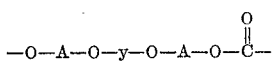

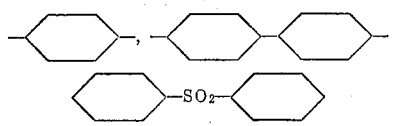

and

$R_1$ and $R_2$ being selected from the group consisting of hydrogen, unbranched and branched monovalent aliphatic hydrocarbon residues up to 10 carbon atoms, monovalent cycloaliphatic residues, monovalent araliphatic hydrocarbon residues having up to 4 carbon atoms as side-chains, the phenyl and the furyl residue, Z representing the carbon and hydrogen atoms completing a cycloaliphatic ring, and each nucleus being substituted with 1–4 halogen atoms.

These polycarbonates are distinguished by the sum of some remarkable properties which is not known on other comparable high molecular weight linear polycarbonates known in the art such as the corresponding polycarbonates which are not halogen-substituted at the nuclei or polycarbonates of non-hydroxyalkylated aromatic dihydroxy compounds, especially of 4,4'-dihydroxy-diarylene alkanes, halogenated as well as non-halogenated at the nuclei. Such special properties of the new polycarbonates are for instance: a relatively low melt viscosity in connection with a particularly good solubility in a great number of usual solvents, an extremely high resistance to hydrolysis by acids and especially by aqueous bases, an extremely low water absorption, a high resistance to air at elevated temperatures, an extremely low tendency to crystallization and a high resistance to inflammability. The following table compares the corresponding values of some typical representatives of polycarbonates.

| | Polycarbonate of 2,2-(4,4'-dihydroxy-diphenylene)-propane | Polycarbonate of 2,2-(4,4'-dihydroxy-3,5,3',5'-tetra-chloro-diphenylene)-propane | Polycarbonate of 2,2-(4,4'-dihydroxy-diphenylene)-propane-bis-(β-oxyethyl-ether) | Polycarbonate of 2,2-(4,4'-dihydroxy-3,5,3',5'-tetrachloro-diphenylene)-propane-bis-(β-oxyethyl-ether) |
|---|---|---|---|---|
| Viscosity of the melt (K-value 52 at 280° C.) | about 30,000 poises | >50,000 poises | <10,000 poises | <10,000 poises. |
| Solubility in— | | | | |
| methylene chloride | + | + | ++ | ++ |
| chloroform | + | + | ++ | ++ |
| benzene | (+) | + | + | + |
| toluene | (+) | (+) | + | + |
| acetic acid ester | − | ((+)) | (+) | ((+)) |
| acetone | − | − | − | |
| Softening point | about 220° C | about 250° C | 120–130° C | 170–190° C. |
| Second order transition point | 140–150° C | about 180° C | about 40° C | 80–90° C. |
| Saponifiability of a foil with 50 mμ thickness in aqueous caustic potassium solution by boiling for 2 hours. | saponifying number=28 | 0 | saponifying number=6 | saponifying number=0. |
| Water absorption in 95 percent relative humidity content. | 0.16 | 0.18 | 0.13 | 0.08. |
| In 65 percent relative humidity content | 0.09 | 0.09 | 0.05 | 0.01. |
| Discoloration after heating for 1 hour in air at 200° C. (discoloration number of the starting material=1). | 2–3 | 3–4 | 2 | 2. |
| Inflammability | inflammable | non-inflammable | inflammable | non-inflammable. |

++=very well soluble, +=well soluble, (+)=poorly soluble, ((+))=very poorly soluble, −−=insoluble.

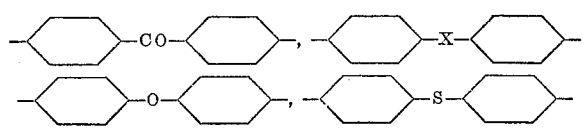

X being selected from the group consisting of

The sum of the properties of the new polycarbonates, particularly the low tendency for crystallization and the good solubility in a great number of solvents, makes these plastics suitable especially for manufacturing moulded articles by injection moulding and for coatings respectively, particularly when non-inflammability is desired.

The new polycarbonates may be produced by polyinteresterifying the corresponding dihydroxy compounds with dialkyl- or diaryl esters of carbonic acid, e.g. dimethyl-, diethyl-, dipropyl-, dibutyl-, diamyl-, dioctyl-, dicyclohexyl-, and especially with the diphenyl- and di- o- m- or p-toluyl carbonic acid ester, or with mixed esters, for instance with the methyl-ethyl, the methyl-propyl, the ethyl-propyl, the methyl-cyclohexyl, the ethyl-cyclohexyl, the propyl-cyclohexyl, the methyl-phenyl, the ethyl-phenyl, the propyl-phenyl, the ethyl-o-, m- or p-toluyl and the cyclohexyl phenyl carbonate, that is by heating mixtures of the dihydroxy compounds and the carbonic acid esters in about equimolecular ratios at temperatures from about 120° to about 300° C. and especially from about 170° to about 270° C. preferably under reduced pressure while splitting off the corresponding monohydric alcohol or phenol respectively until a viscous film- and fibre-forming melt is obtained.

Instead of mixtures of the corresponding dihydroxy compounds and dialkyl- or diaryl esters of carbonic acid mentioned above there may also be heated bis-alkyl-, cycloalkyl- or aryl esters of the corresponding dihydroxy compounds alone or in mixture with free dihydroxy compounds. In the first case neutral dialkyl-, di-cycloalkyl or diaryl carbonate splits off, in the second case the corresponding monohydroxy alkyl-, cycloalkyl- or aryl compound splits off.

In general inter-esterifying catalysts such as: inorganic bases, for example caustic soda and potassium hydroxide, high boiling organic bases such as acridine, metal hydrides such as lithium and calcium hydride, alkali or alkaline earth metals such as sodium, potassium, magnesium, and calcium, metal oxides such as zinc oxide, aluminium oxide, lead oxide, antimonotrioxide, cerium oxide, and boron oxide, acids such as phosphoric acid and p-toluene sulphonic acid, and salts such as sodium benzoate, calcium acetate, and boron phosphate, and alcoholates and phenolates may be added to the reaction mixture.

When using basic catalysts we prefer to neutralise the catalyst by adding basic-binding agents to the melt towards the end of the poly-inter-esterification. Suitable base-binding agents are for instance aromatic sulphonic acids such as p-tolyl sulphonic acid, organic acid halides such as stearyl chloride, butyryl chloride, benzoyl chloride, and toluene sulphochloride, organic chlorocarbonates such as phenyl chloroformate, p-hydroxy-diphenyl chloroformate, and bis-chloroformates of di-monohydroxy arylene alkanes, dialkylsulphates such as dimethyl sulphate and dibutyl sulphate, organic chlorine compounds such as benzyl chloride and ω-chloroacetophenone as well as acid salts of polycondensation inorganic acids such as ammonium hydrogen sulphate.

Base-binding substances which are volatile under greatly reduced pressure at esterification temperatures are especially suitable since an incidental excess over that required to neutralise the basic catalysts can be easily removed from the melt. Dimethyl sulphate, phenylchloroformate and benzoyl chloride are examples of substances of this group.

The dihydroxy compounds which may be used for the production of the new polycarbonates are obtainable by reacting the corresponding nucleus-halogenated aromatic dihydroxy compounds with ethylene oxide or propylene oxide by methods well known in the art.

Among the aromatic dihydroxy compounds suitable for the present invention there may be mentioned: halogenated hydroquinone, 4,4'-dihydroxydiphenyl, 4,4'-dihydroxydiphenylene sulphone, 4,4'-dihydroxybenzophenone, and particularly halogenated 4,4'-dihydroxydiphenylene alkanes such as 4,4'-dihydroxydiphenylene methane, 1,1-(4,4'-dihydroxy-diphenylene)-ethane,
1,1-(4,4'-dihydroxy-diphenylene)-propane,
1,1-(4,4'-dihydroxy-diphenylene)-butane,
1,1-(4,4'-dihydroxy-diphenylene)-2-methyl-propane,
1,1-(4,4'-dihydroxy-diphenylene)-heptane,
1,1-(4,4'-dihydroxy-diphenylene)-1-phenyl-methane,
(4,4'-dihydroxy-diphenylene)-(4-methyl-phenylene)-methane,
(4,4'-dihydroxy-diphenylene)-(4-ethyl-phenylene)-methane,
(4,4'-dihydroxy-diphenylene)-(4-isopropyl-phenylene)-methane,
(4,4'-dihydroxy-diphenylene)-(4-butyl-phenylene)-methane,
(4,4'-dihydroxy-diphenylene)-benzyl-methane,
(4,4'-dihydroxy-diphenylene)-α-furyl-methane,
2,2-(4,4'-dihydroxy-diphenylene)-propane,
2,2-(4,4'-dihydroxy-diphenylene)-butane,
2,2-(4,4'-dihydroxy-diphenylene)-pentane (melting point 149–150° C.),
2,2-(4,4'-dihydroxy-diphenylene)-4-methyl-pentane,
2,2-(4,4'-dihydroxy-diphenylene)-heptane (boiling point 198–200° C. under 0.3 mm. mercury gauge),
2,2-(4,4'-dihydroxy-diphenylene)-octane,
2,2-(4,4'-dihydroxy-diphenylene)-nonane (melting point 68° C.),
1,1-(4,4'-dihydroxy-diphenylene)-1-phenyl-ethane,
(4,4'-dihydroxy-diphenylene)-1-(α-furyl)-ethane,
3,3-(4,4'-dihydroxy-diphenylene)-pentane,
4,4-(4,4'-dihydroxy-diphenylene)-heptane,
1,1-(4,4'-dihydroxy-diphenylene)-cyclopentane,
1,1-(4,4'-dihydroxy-diphenylene)-cyclohexane,
furthermore
4,4'-dihydroxy-diphenylene oxide,
4,4'-dihydroxy-diphenylene sulphide,
1,5-dihydroxy naphthalene, 2,6-dihydroxy naphthalene and 1,4-dihydroxy naphthalene.

As mentioned above the nuclei of these aromatic dihydroxy compounds may be substituted with 1–4 halogen atoms that is with fluorine, chlorine, bromine and iodine. Special halogenated aromatic dihydroxy compounds are for instance Octa-chloro-4,4'-dihydroxy-diphenyl,
Tetra-chloro-4,4'-dihydroxy-diphenyl,
Tri-chloro-4,4'-dihydroxy-diphenyl,
Di-chloro-4,4'-dihydroxy-diphenylene sulphone (melting point 194–195.5° C.),
2,2-(4,4'-dihydroxy-3,3'-di-chloro-diphenylene)-propane,
2,2 - (4,4' - dihydroxy - 3,5,3',5' - tetra - chloro - diphenylene)-propane,
2,2 - (4,4' - dihydroxy - 3,5,3',5' - tetra - bromo - diphenylene)-propane (melting point 176–180° C.),
1,1 - (4,4' - dihydroxy - 3,5,3',5' - tetra - chloro - diphenylene)-cyclohexane (melting point 148–149.5° C.),
2,3,5,-tri-chloro-1,4-dihydroxy-naphthalene,
2,3-di-chloro-5-bromo-1,4-dihydroxy-naphthalene,
4,8-di-chloro-1,5-dihydroxy-naphthalene,
1,5-di-chloro-1,6-dihydroxy-naphthalene,
2,3,5,6-tetra-chloro-hydroquinone,
3,5,3',5' - tetra - chloro - 4,4' - dihydroxy - diphenylene - methane,
2,3,5,6,2',3',5',6' - octa - chloro - 4,4' - dihydroxy - diphenylene-methane,
3,5,3',5'-tetra-chloro-4,4'-dihydroxy-benzophenone,
3,5,3',5'-tetra-bromo-4,4'-dihydroxy-benzophenone.

A part of the nucleus halogenated alkoxylated dihydroxy compounds mentioned above may be replaced by non-halogenated aliphatic, cycloaliphatic or aromatic dihydroxy compounds such as diethylene glycol, triethylene glycol, polyethylene glycol, thiodiglycol, ethylene dithiodiglycol, the di-, and polyglycols produced from propylene-oxide-1,2, o-, m-, or p-xylylene glycol, propanediol-1,3, butanediol-1,3, butanediol-1,4, 2-methylpropanediol-1,3, pentanediol-1,5, 2-ethylpropanediol-1,3, hexanediol-1,6, octanediol-1,8, 1-ethylhexanediol-1,4 and decanediol-1,10, cyclohexanediol-1,4, 2,2-(4,4'-di-hydroxy-dicyclohexylene)-propane and 2,6-dihydroxy-decahydronaphthalene, hydroquinone, resorcinol, 4,4'-dihydroxy-diphenyl, 1,4-dihydroxy-naphthalene, 1,6-dihydroxy-naphthalene, 2,6-dihydroxy-naphthalene, 1,5-dihydroxy-naphthalene, dihydroxy-anthracene, 4,4'-dihydroxy-dinaphthyl-1,1', and m-, p-hydroxy-benzylalcohol and particularly 4,4'-dihydroxy-diphenylene alkanes, sulphones, oxides and sulphides mentioned above, but non-halogenated. In general however, the mixtures should be composed in such a manner that the halogen content of the end product is up to about 10 percent and particularly between about 5 to about 40 percent by weight.

Example 1

A mixture of 0.1 mol of 2,3,5,6-tetra-chloro-hydroquinone-bis-(β-hydroxyethyl ether)=33.6 parts by weight and 0.1006 mol of diphenyl carbonate=21.52 parts by weight is heated under stirring and passing through purified nitrogen during 2 hours at 200° C. Then the temperature is increased to 230° C. during a further hour and the heating at that temperature is continued for 3 hours. After slowly increasing the temperature to 250° C. the reaction chamber is evacuated during ½ hour at 0.1 mm. mercury gauge. Under these conditions the heating is continued for further 2 hours. One obtains a viscous melt which solidifies to a completely clear plastic when cooling. The softening point is 195–198° C.

Example 2

A mixture of 41.2 parts by weight of 4,4'-dihydroxy-3,5,3',5' - tetra - chloro - diphenyl - bis - (β - hydroxyethylether) (melting point 203–204° C.), 21.8 parts by weight of diphenylcarbonate and 0.0005 part by weight of lithium-hydride is melted under stirring while passing through purified nitrogen. The phenol split off is distilled off at 220° C. and 50 mm. mercury gauge. After 1 hour the pressure is slowly reduced to 0.5 mm. mercury gauge and the temperature raised to 270° C. After a further 1½ hours a high viscous melt is obtained which solidifies after cooling to a lightly yellowish clear plastic with a softening point of 225–240° C.

Example 3

A mixture of 45.4 parts by weight of 2,2-(4,4'-dihydroxy - 3,5,3',5' - tetra - chloro - diphenylene) - propane - bis-(β-hydroxyethyl ether) (melting point 117–118° C.), 22.0 parts by weight of diphenyl carbonate, and 0.002 part by weight of lithium hydride is melted under stirring and while passing through purified nitrogen. The bulk of the phenol split off is then distilled off at a temperature of 180–200° C. and the pressure then reduced to 50 mm. mercury gauge within 1 hour. Within a further hour the pressure is slowly reduced to 0.3 mm. mercury gauge and the temperature increased to 250° C. and within a further hour to 270° C. while stirring. One obtains a viscous melt. After cooling the melt solidifies to a clear, transparent, almost colourless plastic with a K-value of 45.2, measured in a 0.5 percent methylene chloride solution at 20° C. The softening point is 170–190° C. The product is soluble for instance in methylene chloride, chloroform, benzene and toluene. From solution for instance in methylene chloride or from the melt there may be produced films, fibres, and moulded articles. The mechanical properties of such articles may be increased by stretching.

Example 4

A mixture of 18.95 parts by weight of 2,2-(4,4'-dihydroxy - 3,5,3',5' - tetra - bromo - diphenylene) - propane - bis-(β-hydroxyethyl-ether) (melting point 104–105° C.), 22.13 parts by weight of 2,2-(4,4'-dihydroxy-diphenylene)-propane-bis-(β-hydroxyethylether) and 21.80 parts by weight of diphenyl carbonate is melted under stirring and while passing through purified nitrogen. The heating is continued at 50 mm. mercury gauge for ½ hour at 180° C. and for a further ½ hours at 200° C. while distilling off the phenol split off. During a further hour the pressure is reduced to 0.5 mm. mercury gauge and the temperature raised to 250° C. The heating is continued until a viscous melt is obtained. After cooling the viscous melt a plastic is obtained with the softening point of 160–170° C.

Example 5

A mixture of 40.86 parts by weight of 2,2-(4,4'-dihydroxy - 3,5,3',5' - tetra - chloro - diphenylene) - propane - bis-(β-hydroxy-ethylether), 4.94 parts by weight of 1,1-(4,4' - dihydroxy - 3,5,3',5' - tetra - chloro - diphenylene) - cyclohexane - bis - (β - hydroxyethylether) (melting point 129–130° C.), 21.80 parts by weight of diphenyl carbonate and 0.001 part by weight of lithium hydride is polycondensed as described in Example 4. After cooling one obtains a thermoplastic material with the softening point of 180–205° C. It may be worked up to films, fibres and moulded articles from the melt or from a solution.

Example 6

A mixture of 36.32 parts by weight of 2,2-(4,4'-dihydroxy - 3,5,3',5' - tetra-chloro - diphenylene)-propane-bis-(β-hydroxyethylether), 6.32 parts by weight of 2,2'-(4,4'-di-hydroxy-diphenylene) - propane-bis - (β-hydroxyethylether), 21.80 parts by weight of diphenyl carbonate and 0.0005 part by weight of lithium hydride is polycondensed as described in Example 4. The so obtained plastic has a softening point of 160–180°C.

Example 7

A mixture of 36.32 parts by weight of 2,2-(4,4'-dihydroxy-3,5,3',5'-tetra-chloro-diphenylene) - propane-bis-(β-hydroxy-ethylether), 9.62 parts by weight of 2,2-(4,4'-dihydroxy-3,5,3',5' - tetra-chlorodiphenylene) - propane-bis-(β-hydroxypropylether), 21.80 parts by weight of diphenyl carbonate and 0.0005 part by weight of lithium hydride is polycondensed as described in Example 4 to a plastic with a softening point of 148–160°C. It has a very good solubility and is suitable particularly for the production of lacquers and coatings.

Example 8

A mixture of 30.5 parts by weight of bis-ethylcarbonate of the 2,2-(4,4'-dihydroxy-3,5,3',5'-tetra-chloro-diphenylene)-propane-bis-(β-hydroxyethylether), 22.7 parts by weight of 2,2-(4,4'-dihydroxy-3,5,3',5'-tetra-chloro-diphenylene)-propane-bis-(β-hydroxyethylether) and 0.001 part by weight of lithium hydride is melted under stirring and while passing through purified nitrogen. While heating for 2 hours the bulk of the ethanol split off is distilled off. Then the pressure is slowly reduced to 0.5 mm. mercury gauge and the temperature raised to 260°C., and the heating is continued until a viscous melt is obtained. The properties of the resulting polycarbonate correspond to those of the product of Example 3.

We claim:

1. High molecular weight, fiber and film-forming thermoplastic, linear polycarbonates consisting essentially of recurring units of the formula $$-O-(CH_2)_n-O-Ar-O-(CH_2)_n-O-\overset{O}{\underset{\|}{C}}-$$

wherein $n$ is an integer from 2–3, and the —Ar— substituent represents the nucleus of a dihydroxy aromatic compound which is directly connected to the oxygen atoms through para linkages, —Ar— being selected from the group consisting of

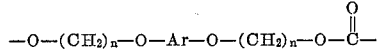

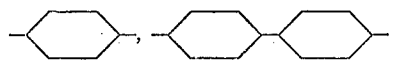

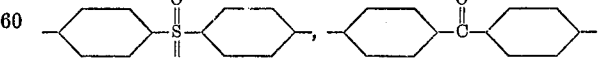

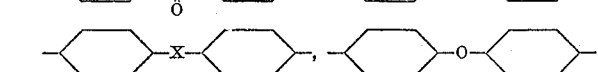

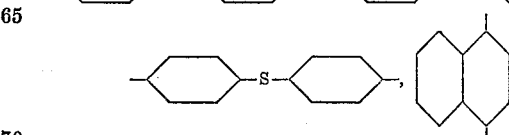

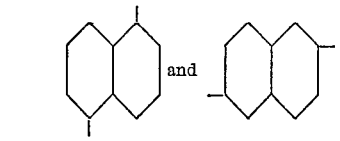

X being selected from the group consisting of

and

$R_1$ and $R_2$ being selected from the group consisting of hydrogen, unbranched and branched monovalent aliphatic hydrocarbon radicals, monovalent araliphatic hydrocarbon radicals having up to 4 carbon atoms as side-chains, phenyl and furyl, Z representing the carbon and hydrogen atoms completing a cyclo-aliphatic ring, and where said —Ar— substituent is substituted by 1–4 halogen atoms in the nucleus.

2. The polycarbonates of claim 1 wherein the halogen atoms are chlorine atoms.

3. The polycarbonates of claim 1 wherein the halogen atoms are bromine atoms.

4. The polycarbonates of claim 1 wherein —Ar— is derived from a chlorinated dihydroxynaphthalene.

5. The polycarbonates of claim 1 wherein —Ar— is derived from a chlorinated 4,4-dihydroxy diphenyl.

6. The polycarbonates of claim 1 wherein —Ar— is derived from chlorinated 4,4-dihydroxy-diphenylene sulfone.

7. The polycarbonates of claim 1 wherein —Ar— is derived from a chlorinated 4,4-dihydroxy-diphenylene alkane.

8. The polycarbonates of claim 1 wherein —Ar— is derived from a chlorinated 4,4'-dihydroxy-diphenylene methane.

9. The polycarbonates of claim 1 wherein —Ar— is derived from a chlorinated 2,2-(4,4'-dihydroxy-diphenylene)-propane.

10. The polycarbonates of claim 1 wherein —Ar— is derived from a chlorinated 4,4'-dihydroxy-diphenylene oxide.

11. The polycarbonates of claim 1 where —Ar— is derived from a chlorinated 4,4'-dihydroxy-diphenylene sulfide.

12. The polycarbonates of claim 1 wherein —Ar— is derived from a chlorinated hydroquinone.

13. The polycarbonates of claim 1 wherein the recurring units correspond to the formula:

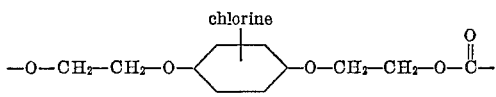

14. The polycarbonates of claim 1 wherein the recurring units correspond to the formula:

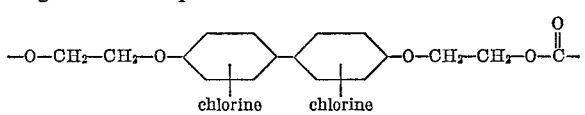

15. The polycarbonates of claim 1 wherein the recurring units correspond to the formula:

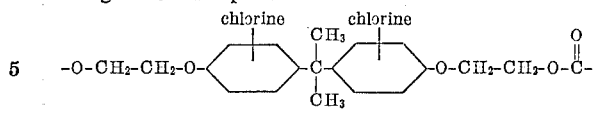

16. The polycarbonates of claim 1 wherein the recurring units correspond to the formula:

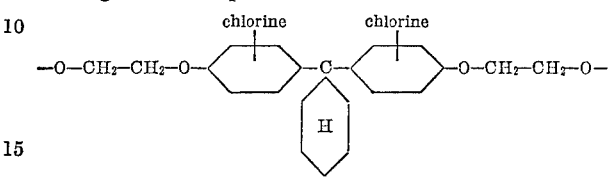

17. The polycarbonates of claim 1 wherein the recurring units correspond to the formula:

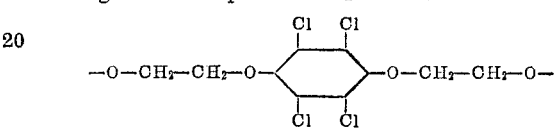

18. The polycarbonates of claim 1 wherein the recurring units correspond to the formula:

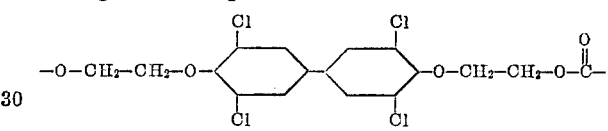

19. The polycarbonates of claim 1 wherein the recurring units correspond to the formula:

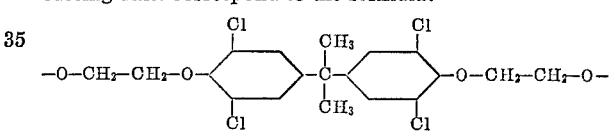

20. The polycarbonates of claim 1 wherein the recurring units correspond to the formula:

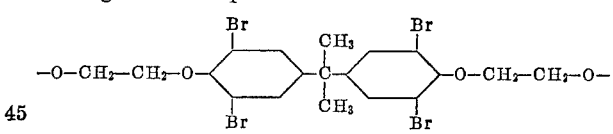

21. The polycarbonates of claim 1 wherein the recurring units correspond to the formula:

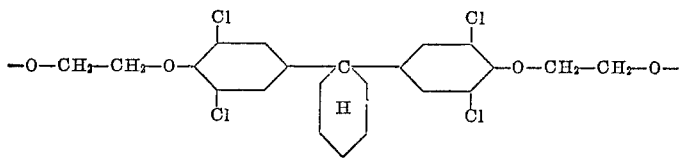

References Cited in the file of this patent

UNITED STATES PATENTS

| | | |
|---|---|---|
| 2,035,578 | Wagner | Mar. 31, 1936 |
| 2,789,972 | Reynolds et al. | Apr. 23, 1957 |
| 2,799,666 | Caldwell | July 16, 1957 |
| 2,799,694 | Ross et al. | July 16, 1957 |

FOREIGN PATENTS

| | | |
|---|---|---|
| 772,627 | Great Britain | Apr. 17, 1957 |